United States Patent
Chen et al.

(10) Patent No.: US 12,198,054 B2
(45) Date of Patent: Jan. 14, 2025

(54) MODEL COMPRESSION BY SPARSITY-INDUCING REGULARIZATION OPTIMIZATION

(71) Applicant: Microsoft Technology Licensing, LLC, Redmond, WA (US)

(72) Inventors: Tianyi Chen, Redmond, WA (US); Sheng Yi, Redmond, WA (US); Yixin Shi, Redmond, WA (US); Xiao Tu, Medina, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/458,709

(22) Filed: Aug. 30, 2023

(65) Prior Publication Data
US 2023/0419111 A1 Dec. 28, 2023

Related U.S. Application Data

(62) Division of application No. 16/889,775, filed on Jun. 1, 2020, now Pat. No. 11,790,226.

(51) Int. Cl.
*G06N 3/04* (2023.01)
*G06N 3/08* (2023.01)

(52) U.S. Cl.
CPC ............... *G06N 3/08* (2013.01); *G06N 3/04* (2013.01)

(58) Field of Classification Search
CPC ................ G06N 3/08; G06N 3/04
See application file for complete search history.

(56) References Cited

U.S. PATENT DOCUMENTS

| | | | | |
|---|---|---|---|---|
| 2014/0310221 | A1* | 10/2014 | Min | G06N 20/00 |
| | | | | 706/25 |
| 2021/0065052 | A1* | 3/2021 | Muralidharan | G06N 7/01 |
| 2021/0192808 | A1* | 6/2021 | Chen | G06N 3/08 |

\* cited by examiner

*Primary Examiner* — Stephen G Sherman

(57) ABSTRACT

The performance of a neural network (NN) and/or deep neural network (DNN) can limited by the number of operations being performed as well as management of data among the various memory components of the NN/DNN. A sparsity-inducing regularization optimization process is performed on a machine learning model to generate a compressed machine learning model. A machine learning model is trained using a first set of training data. A sparsity-inducing regularization optimization process is executed on the machine learning model. Based on the sparsity-inducing regularization optimization process, a compressed machine learning model is received. The compressed machine learning model is executed to generate one or more outputs.

19 Claims, 9 Drawing Sheets

MODEL COMPRESSION BY SPARSITY-INDUCING REGULARIZATION OPTIMIZATION

CROSS-REFERENCE TO RELATED APPLICATIONS

This application is a division of U.S. patent application Ser. No. 16/889,775 filed Jun. 1, 2020, entitled "Model Compression by Sparsity-Inducing Regularization Optimization," which is incorporated herein by reference in its entirety.

BACKGROUND

Machine learning is increasingly being utilized to perform a variety of tasks in a variety of environments where patterns and inferences may be used in place of explicit programming. Processing data in some machine learning systems such as in a neural network (NN) or a deep neural network (DNN) typically require significant numbers of parameters and floating-point operations (FLOPs). The processing of iterations over large amounts of data may result in latencies that may impact desired stated processing goals (e.g., identifying an object and/or object characteristic in example input data—image, sound, geographic coordinates, etc.). To improve performance in such systems (i.e., compress the model without sacrificing model accuracy), it is desirable to formulate and solve particular optimization problems to filter out redundant hyperparameters for producing a slimmer model but with similar generalization accuracy.

It is with respect to these considerations and others that the disclosure made herein is presented.

SUMMARY

Model compression typically involves taking a full model which achieves a very high testing accuracy and finding a smaller or less complex model to achieve a similar testing accuracy. It is desirable that model compression achieve the following objectives:

Smaller model size
Faster performance.
No regression on generalization performance (e.g., accuracy on testing datasets)
The compression is not time-consuming.

Essentially, model compression should be equivalent to searching for an optimal topological model structure. However, the searching problem is typically NP-hard.

There are a number of drawbacks in existing model compression methods. Many model compression methods are heuristic and may not easily achieve convergence in view of optimization (e.g., the loss function may diverge), which may sacrifice testing accuracy. Another disadvantage is that the solution may not be applicable to other network architectures. For example, the compression algorithm may only apply to standard convolutional neural network (CNN) compression. The solutions may not easily be extended to other users and applications, and significant development effort may be required to do so. Additionally, retraining on the compressed model is typically required.

The described embodiments describe a solution that is generic to the model architecture. The solution may be extended by filing into an optimizer class, which may be easily to be inserted during model training. The described embodiments are not heuristic and can achieve a high compression ratio without sacrificing accuracy. For the group sparsity mode, retraining on the compressed model may not be required.

The disclosed embodiments provide a model compression framework based on sparsity-inducing regularization optimization to achieve effective model compression. A stochastic optimization algorithm as described below (and referred to herein as OBProxSG) is disclosed. The disclosed embodiments may, for example, be used to compress deep learning models. For applications in which optimization is desired, a typical objective is a subset of the solutions with specified properties. In many cases the objective function is augmented by adding a regularization term. One example is sparsity-inducing regularization, which encourages highly sparse solutions (including many zero elements). Such regularization typically produces shrinkage effects that reduce the magnitude of the solutions. Among various methods of introducing sparsity, $\ell$-regularization is one popular choice. Its utility has been demonstrated ranging from improving the interpretation and accuracy of model estimation to compressing heavy models for efficient inference.

The techniques described herein provide for a stochastic method for solving the following $\ell_1$-regularization problem $$\underset{x \in \mathbb{R}^n}{\text{minimize}} \ \{F(x) \stackrel{\text{def}}{=} f(x) + \lambda \|x\|_1\} \quad (1)$$

where $f(x)$ is the raw objective function, and $\lambda > 0$ is a weighting term. Of interest is $f(x)$ as the average of numerous continuously differentiable instance functions $f_i : \mathbb{R}^n \to \mathbb{R}$, i.e., $$f(x) = \frac{1}{N} \sum_{i=1}^{N} f_i(x)$$

The present disclosure describes an orthant-based proximal stochastic gradient method (OBProx-SG) in a way that uses the benefits of orthant-based methods and Prox-SG and avoids their drawbacks. A stochastic algorithmic framework is disclosed that utilizes the standard Prox-SG step and the reduced space orthant step to effectively solve problem (1) with a theoretical support of convergence under the convex formulation. The disclosed methods use the sparsity of solutions by combining the moderate truncation mechanism of Prox-SG and the aggressive orthant face optimization. The disclosed methods do not rely on the dual averaging techniques that are used in either RDA or Prox-SVRG to promote sparsity and facilitate the convergence.

During the orthant step, OBProx-SG utilizes the sign of the previous iteration to select an orthant face, which is more efficient compared with other strategies that involve computations of the (sub)gradient such as in deterministic orthant-based algorithms. Moreover, instead of optimizing with second-order methods as in the deterministic case, only the first-order derivative information is used in order to progress in the selected orthant face.

The model compression framework based on sparsity-inducing regularization optimization can reduce the amount of data that needs to be processed and thus provide improvements to the use of computing resources such as processor cycles, memory, network bandwidth, and power. Effective model compression when processing iterations over large amounts of data may provide improved latencies for a number of applications that use such technologies, such as image and sound recognition, recommendation generation systems, and data (e.g., image) analysis. It should be appreciated that, although described in relation to a method, the above-described subject matter may also be implemented as a system, a computer-controlled apparatus, a computer process, a computing system, or as an article of manufacture such as a computer-readable medium and/or dedicated chipset. These and various other features will be apparent from a reading of the following Detailed Description and a review of the associated drawings. This Summary is provided to introduce a selection of concepts in a simplified form that are further described below in the Detailed Description.

This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DRAWINGS

The Detailed Description is described with reference to the accompanying FIGS. In the FIGS., the left-most digit(s) of a reference number identifies the FIG. in which the reference number first appears. The same reference numbers in different FIGS. indicate similar or identical items.

DETAILED DESCRIPTION

Figure 1:
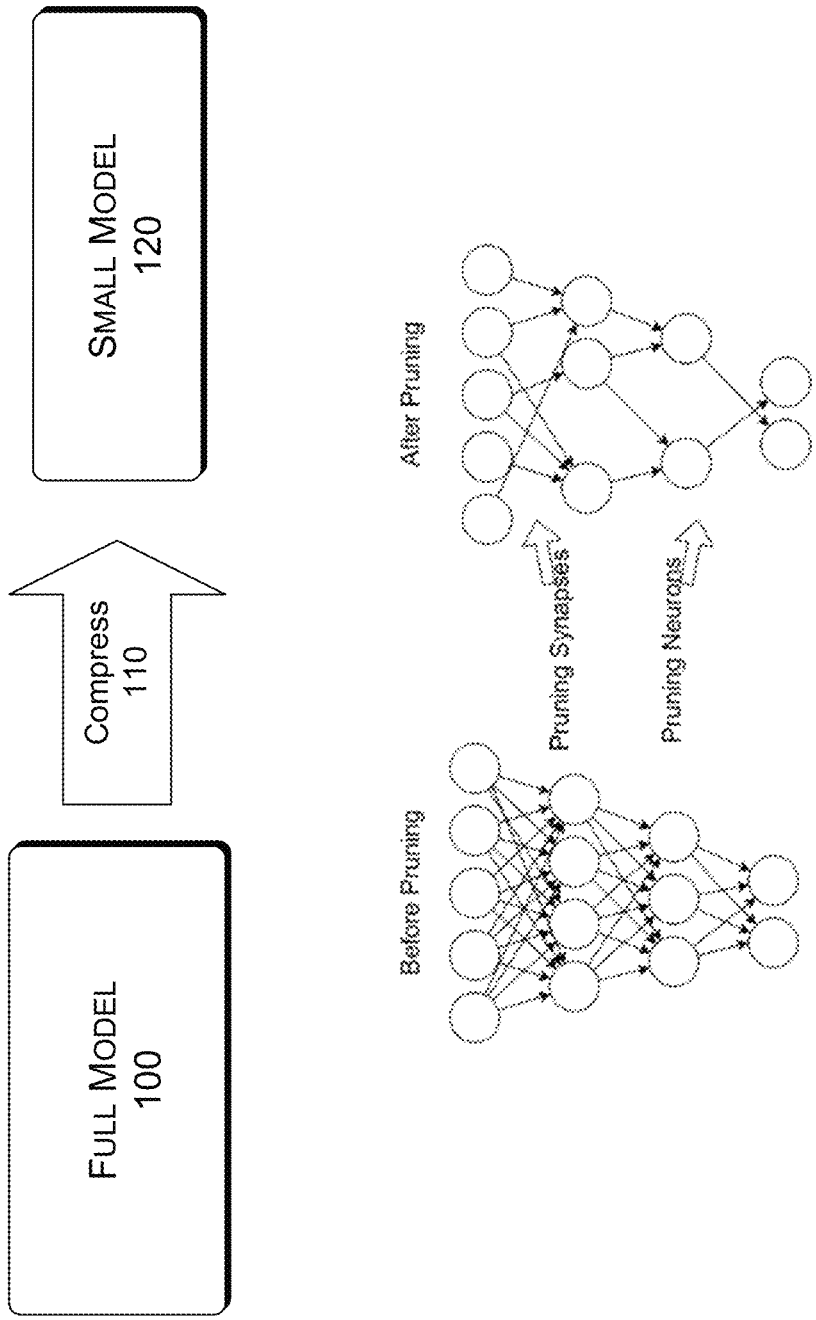
FIG. 1 is a diagram illustrating model compression according to one embodiment disclosed herein.

Model compression may be defined as receiving a full model which achieves very high testing accuracy and finding a smaller or less complex model that achieves similar testing accuracy. Referring to FIG. 1, a full model 100 may achieve high testing accuracy. A compression process 110 should achieve a smaller model 120 that has similar testing accuracy. For example, after a neural network is pruned, the number of neurons and neuron synapses may be reduced as shown in the figure. It is desirable that model compression achieve the following objectives:
  Smaller model size
  Faster performance.
  No regression on generalization performance (e.g., accuracy on testing datasets)
  The compression is not time-consuming.

Essentially, model compression should be equivalent to searching for an optimal topological model structure. However, the searching problem is typically NP-hard. There are a number of drawbacks in existing model compression methods. Many model compression methods are heuristic and may not easily achieve optimization, which may sacrifice testing accuracy. Additionally, the loss function may diverge. Another disadvantage is that the solution may not be applicable to other network architectures. For example, the solution may only apply to standard convolutional neural network (CNN) compression. The solutions may not easily be extended to other users and applications, and significant development effort may be required to do so. Additionally, retraining on the compressed model is typically required.

Figure 2A:
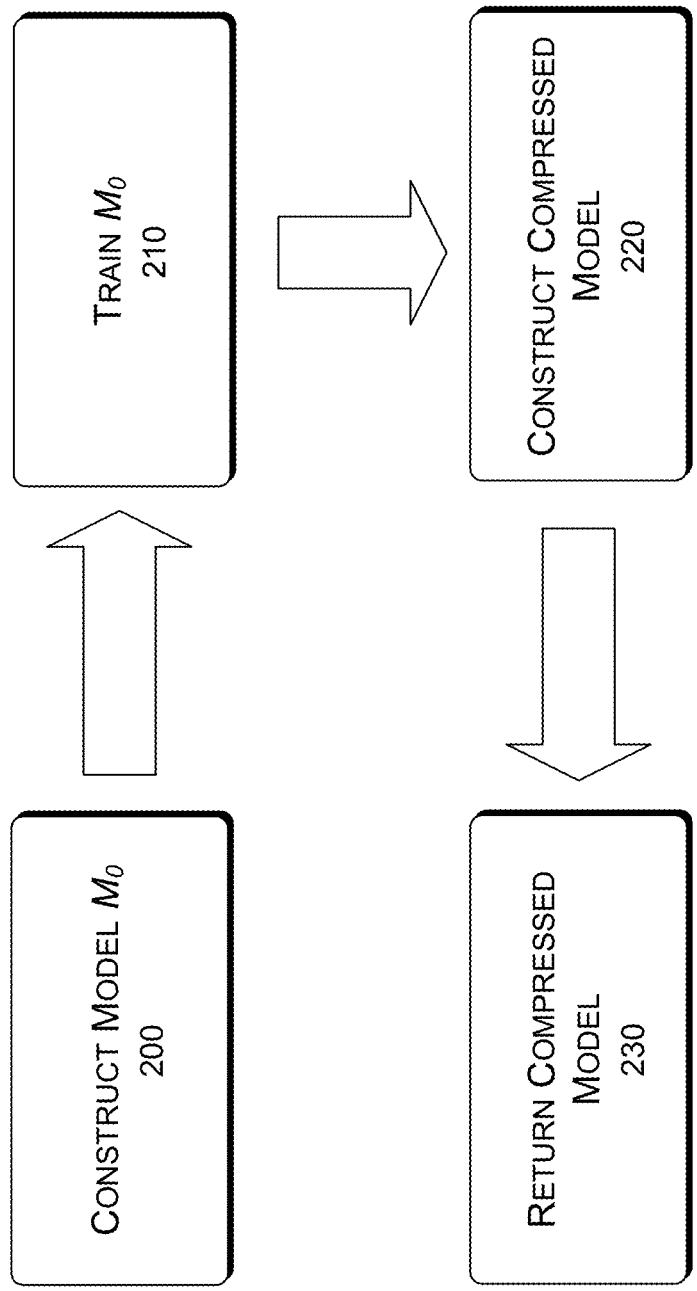
FIG. 2A is a diagram illustrating model compression according to one embodiment disclosed herein.

Referring to FIG. 2A, effective model compression may be achieved by constructing a model $M_0$ as shown in operation 200, which may be complex and require significant processing overhead. Operation 210 illustrates training via $$\min_x f(x \mid M_0) + \lambda \Omega(x \mid M_0).$$

The described optimization problem may be solved using the disclosed algorithms. Operation 220 illustrates constructing a compressed model. Operation 230 illustrates returning the compressed model. In some implementations, retraining may not be necessary depending on the selection of $\Omega$.

The sparsity-inducing regularization term can allow the solution of the above problem to be sparse (e.g., containing many zero elements) in different patterns. Sparsity-inducing regularization should not negatively impact model accuracy, and can even increase model accuracy under certain conditions since regularization sacrifices the bias of the model estimate but may reduce the variance.

Different $\Omega(x)$ choices may result in different patterns of sparsity for model parameters. For l1 norm of x:

$$\Omega(x) = \|x\|_1$$

and each element in x may individually set as zero.
  Mixed l1/lp norm of x:

$$\Omega(x) = \sum_{g \in G} \|[x]_g\|_p$$

where G is a partition of variable indices, such a norm can promote a group of elements as zero, referred to as group sparsity.

Figure 2B:
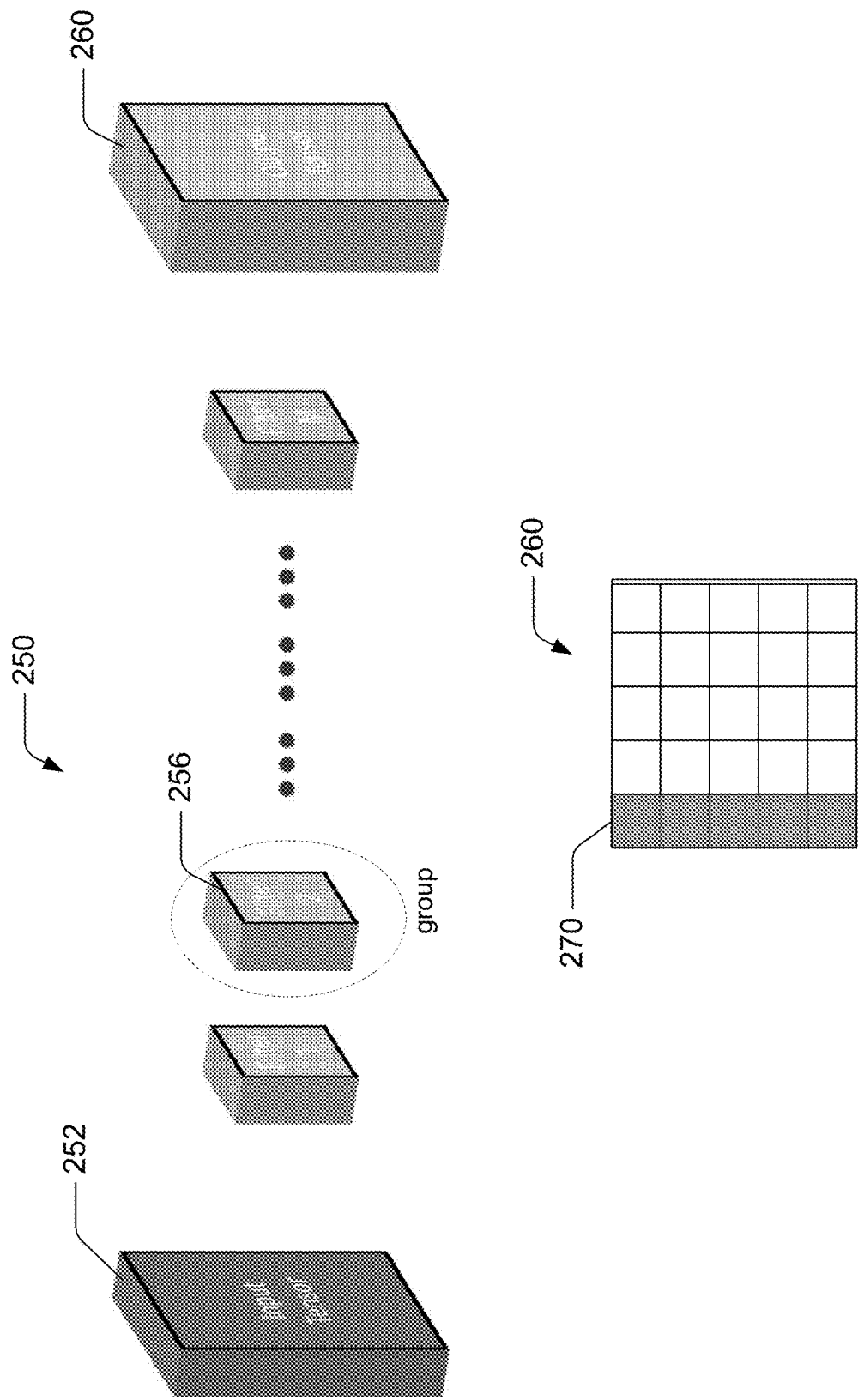
FIG. 2B is a diagram illustrating model compression applications in neural networks, according to one embodiment disclosed herein.

FIG. 2B illustrates examples of applicability to neural network models, for a convolutional neural network (CNN) 250 with an input tensor 252, a group of variables 256 can be defined as a filter in a convolution layer, which can be applied to generate output tensor 260. For a recurrent neural network (RNN) 260, the row or column 270 of the weight matrix can be selected as a group.

The disclosed embodiments provide a model compression framework based on sparsity-inducing regularization optimization to achieve effective model compression. A stochastic optimization algorithm referred to herein as OBProxSG is disclosed. The disclosed embodiments may, for example, be used to compress deep learning models, and can better promote the sparsity of solutions as compared to other methods. For applications in which optimization is desired, a typical objective is a subset of the solutions with specified properties. In many cases the objective function is augmented by adding a regularization term. One example is sparsity-inducing regularization, which encourages highly sparse solutions (including many zero elements). Such regularization typically produces shrinkage effects that reduce the magnitude of the solutions. Among various methods of introducing sparsity, $\ell_1$-regularization is one popular choice. Its utility has been demonstrated ranging from improving the interpretation and accuracy of model estimation to compressing heavy models for efficient inference.

The techniques described herein provide for a stochastic method for solving the following $\ell_1$-regularization problem $$\underset{x \in \mathbb{R}^n}{\text{minimize}} \{F(x) \overset{\text{def}}{=} f(x) + \lambda \|x\|_1\} \quad (1)$$

where f (x) is the raw objective function, and $\lambda > 0$ is a weighting term. Of interest is f (x) as the average of numerous continuously differentiable instance functions $f_i : \mathbb{R}^n \to \mathbb{R}$, i.e., $$f(x) = \frac{1}{N} \sum_{i=1}^{N} f_i(x)$$

Proximal methods may be used to solve the structured non-smooth optimization problems with $\ell_1$-regularization problem. In deterministic optimization, the proximal gradient method (Prox-FG) and its variants, e.g., ISTA, FISTA and SpaRSA are possible, in which only the first-order derivative information is used. First-order methods may be limited in terms of local convergence rate and robustness on ill-conditioned problems, which can be overcome by employing the second-order derivative information as is used in proximal-Newton methods.

However, when Nis large, a straightforward computation of the full gradients or Hessians may be prohibitive due to the costly evaluations over all N instances. In this case, it can be advantageous to use stochastic optimization methods that operate on a small subset of the above summation to economize the computational cost at every iteration.

The proximal stochastic gradient method, referred to herein as Prox-SG, is an extension of the proximal gradient method by using the stochastic gradient on a mini-batch to approximate the full gradient. Nevertheless, there are two potential drawbacks of Prox-SG: (i) the lack of exploitation on the certain problem structure, e.g., the sparsity-inducing regularization in (1); (ii) the much slower convergence rate than Prox-FG due to the variance introduced by random sampling of the true gradients.

To exploit the regularization structure more effectively (produce sparser solutions), a regularized dual-averaging method (RDA) may be applied by extending a simple dual averaging scheme. One advantage of RDA is the utilization of the averaged accumulated gradients of f(x), a global proximal function, and an aggressive coefficient of the proximal function to achieve a more aggressive truncation mechanism than Prox-SG. As a result, RDA may generate much sparser solutions than that generated by Prox-SG in solving (1). On the other hand, to reduce the variance brought by the stochastic approximation, a proximal stochastic variance-reduced gradient method (Prox-SVRG) is developed based on the variance reduction technique SVRG. Prox-SVRG has both capabilities of decent convergence rate and sparsity exploitation, while its iteration cost is much higher than other approaches due to the calculation of full gradient for achieving variance reduction.

Prox-SG, RDA, and Prox-SVRG are stochastic algorithms with some strengths and weaknesses. RDA and Prox-SVRG are derived from proximal gradient methods and make use of different averaging techniques across all instances to effectively exploit the problem structure. However, they only utilize the proximal mapping operator to promote sparse solutions, which is applicable for any non-smooth penalty function. This generic operator may not be sufficiently insightful if the regularizer satisfies extra properties. In particular, non-smooth $\ell_1$-regularized problems typically degenerate to a smooth reduced space problem if zero elements in the solution are correctly identified.

In fact, orthant-based methods, a class of deterministic second-order methods, are motivated by the same observation as above. During the optimization, they predict a sequence of orthant faces, and minimize smooth quadratic approximations to (1) on those orthant faces until a solution is found. Such a process normally yields a more effective active set identification to promote more zero occurrences. Orthant-based methods may be used in deterministic optimization, and may have advantages over proximal methods. In contrast, related prior work in stochastic settings are not common, which may be partially due to expensive and unreliable orthant face selection under random sampling.

The present disclosure describes an orthant-based proximal stochastic gradient method (OBProx-SG) in a way that uses the benefits of orthant-based methods and Prox-SG and avoids their drawbacks. A stochastic algorithmic framework is disclosed that utilizes the standard Prox-SG step and the reduced space orthant step to effectively solve problem (1) with a theoretical support of convergence under the convex formulation. The disclosed methods use the sparsity of solutions by combining the moderate truncation mechanism of Prox-SG and the aggressive orthant face optimization. The disclosed methods do not rely on the dual averaging techniques that are used in either RDA or Prox-SVRG to promote sparsity and facilitate the convergence.

During the orthant step, OBProx-SG utilizes the sign of the previous iteration to select an orthant face, which is more efficient compared with other strategies that involve computations of the (sub)gradient such as in deterministic orthant-based algorithms. Moreover, instead of optimizing with second-order methods as in the deterministic case, only the first-order derivative information is used in order to progress in the selected orthant face.

In an embodiment, an orthant based proximal stochastic gradient method (OBProx-SG) is shown below.

Algorithm 1 Outline of OBProx-SG for solving (1).

1: Input: $x_0 \in \mathbb{R}^n$, $\alpha_0 \in (0, 1)$, and $\{N_\mathcal{P}, N_\mathcal{O}\} \subset \mathbb{Z}^+$.
2: Set $j \leftarrow 0$.
3: for k = 0, 1, 2, . . . do
4:   if k = 0 or $j < N_\mathcal{P}$ then
5:     Compute the Prox-SG step update:
      $x_{k+1} \leftarrow$ Prox-SG($x_k, \alpha_k$) by Algorithm 2.
6:   else if $N_\mathcal{P} \leq j < N_\mathcal{P} + N_\mathcal{O}$ then
7:     Compute the Orthant Step update:
      $x_{k+1} \leftarrow$ Orthant($x_k, \alpha_k$) by Algorithm 3.
8:   Set $j \leftarrow j + 1$.
9:   if $j = N_\mathcal{P} + N_\mathcal{O}$ then
10:     Set $j \leftarrow 0$.
11:   Update $\alpha_{k+1}$ given $\alpha_k$ according to some rule.

In an embodiment, two subroutines may be implemented as shown below.

Algorithm 2 illustrates a Prox-SG process or step:

---
Algorithm 2 Prox-SG Step.
---
1: Input: Current iterate $x_k$, and step size $\alpha_k$.
2: Set $y_0 \leftarrow x_k$.
3: for $t = 0, 1, 2, \ldots, T - 1$ do
4:     Compute the stochastic gradient $g_t$ of f on $\mathcal{B}_t$ $$g_t \leftarrow \nabla f_{\mathcal{B}_t}(y_t) := \frac{1}{|\mathcal{B}_t|} \sum_{i \in \mathcal{B}_t} \nabla f_i(y_t). \quad (3)$$

5:     Compute $y_{t+1} \leftarrow \text{Prox}_{\alpha_k \lambda \|\cdot\|_1}(y_t - \alpha_k g_t)$.
6: Return $x_{k+1} \leftarrow y_T$.
---

Algorithm 3 illustrates an orthant process or step:

---
Algorithm 3 Orthant Step.
---
1: Input: Current iterate $x_k$, and step size $\alpha_k$.
2: Set $y_0 \leftarrow x_k$.
3: for $t = 0, 1, 2, \ldots, T - 1$ do
4:     Compute the stochastic gradient $g_t$ of $\tilde{F}$ on $\mathcal{B}_t$ $$g_t \leftarrow \nabla \tilde{F}_{\mathcal{B}_t}(y_t) \leftarrow \frac{1}{|\mathcal{B}_t|} \sum_{i \in \mathcal{B}_t} \nabla \tilde{F}_i(y_t) \quad (4)$$

5:     Compute $y_{t+1} \leftarrow \text{Proj}_{\mathcal{O}_k}(y_t - \alpha_k g_t)$.
6: Return $x_{k+1} \leftarrow y_T$.
---

Two switching parameters $N_P$ and $N_O$ control a period for each step and when to switch to the other. The switching mechanism (choice of $N_P$ and $N_O$) is related to the convergence of OBProx-SG and the sparsity promotions, which is discussed further below.

In the Prox-SG step, the algorithm performs one epoch of standard proximal stochastic gradient steps to approach a solution to (1). Here "one epoch" may be the set of mini-batches $$\{B_t\}_{t=0}^{T-1}$$

is a partition of $\{1, \ldots, N\}$. At the t-th iteration, $B_t$ is sampled to make an unbiased estimate of the full gradient off (line 4, Algorithm 2). We then utilize the following proximal mapping to yield the next iteration as $$\begin{aligned} y_{t+1} &= \text{Prox}_{\alpha_k \lambda \|\cdot\|_1}(y_t - \alpha_k g_t) \\ &= \underset{x \in \mathbb{R}^n}{\text{argmin}} \frac{1}{2\alpha_k} \|x - (y_t - \alpha_k g_t)\|_2^2 + \lambda \|x\|_1 \end{aligned} \quad (5)$$

It is known that the above subproblem (5) has a closed form solution, and can be computed efficiently as follows:

$$y_{t+1} = \text{sign}(y_t - \alpha_k g_t) \max(0, |y_t - \alpha_k g_t| - \lambda), \quad (6)$$

where each operation in (6) is computed element-wise.

The Prox-SG step may alone be insufficient to exploit the problem structure.

The disclosed embodiments combine the Prox-SG step with the orthant step, which exhibits an aggressive sparsity promotion mechanism while it still remains efficient, as described below.

Since a fundamental to the orthant step is the manner in which the zero and non-zero elements are handled, the following index sets are defined for any $x \in \mathbb{R}^n$:

$$\begin{cases} \mathcal{I}^0(x) := \{i : [x]_i = 0\} \\ \mathcal{I}^+(x) := \{i : [x]_i > 0\} \\ \mathcal{I}^-(x) := \{i : [x]_i < 0\} \end{cases}$$

where $[x]_i$ is the i-th element of x. Furthermore, we denote the non-zero indices of x by $$\mathcal{I}^{\neq 0}(x) := \mathcal{I}^+(x) \cup \mathcal{I}^-(x).$$

To proceed, we define the orthant face $O_k$ that $x_k$ lies in to be $$\{x \in \mathbb{R}^n : \text{sign}([x]_i) = \text{sign}([x_k]_i) \text{ or } [x]_i = 0, 1 \leq i \leq \}$$

such that $x \in O_k$ satisfies:

(i) $[x]_{\mathcal{I}^0(x_k)} = 0$;

for $$i \in \mathcal{I}^{\neq 0}(x_k).$$

$[x]_i$ is either 0 or has the same sign as $[x_k]_i$.

An assumption for the orthant step is that an optimal solution $x^*$ of problem (1) inhabits $O_k$, i.e., $x^* \in O_k$. In other words, the orthant face $O_k$ already covers the support (non-zero entries) of $x^*$. Our goal becomes now minimizing F(x) over $O_k$ to produce more zeros in $x_{k+1}$. By construction this is equivalent to solving a smooth optimization problem on a reduced space.

We are interested in solving the following subproblem, which yields the next iteration $x_{k+1}$:

$$x_{k+1} = \underset{x \in \mathcal{O}_k}{\text{argmin}} F(x) = f(x) + \lambda \|x\|_1. \quad (9)$$

By the definition of $O_k$, we know $$[x]_{\mathcal{I}^0(x_k)} = 0$$

are fixed, and only the entries of $$[x]_{\mathcal{I}^{\neq 0}(x_k)}$$

are free to move. Hence (9) is essentially a reduced space optimization problem. Observing that for any $x \in O_k$, F(x) can be written precisely as a smooth function F(x) in the form $$F(x) \equiv \tilde{F}(X) := f(x) + \lambda \text{ sign}(x_k)^T x,$$

therefore (9) is equivalent to the following smooth problem $$x_{k+1} = \underset{x \in \mathcal{O}_k}{\text{argmin}} \tilde{F}(x). \quad (11)$$

A direct way to solve problem (11) would be the projected gradient descent method. However, since we are dealing with the case where N is large, evaluations on a full gradient may be prohibitive. Instead, a stochastic version may be preferable, as stated in Algorithm 3. The stochastic version performs one epoch of the stochastic gradient descent (SGD)

steps combined with projections onto the orthant face $O_k$. At each t-th iteration, a mini-batch $B_t$ is sampled and is used to approximate the full gradient $$\nabla \tilde{F}(y_t)$$

by the unbiased estimator $$g_t = \nabla \tilde{F}_{B_t}(y_t)$$

(line 4, Algorithm 3). The standard SGD update computes a trial point $$\tilde{y}_{t+1} = y_t - \alpha_k g_t$$

which is then passed into a projection operator $\text{Proj}_{O_k}(\bullet)$ defined as $$\left[\text{Proj}_{O_k}(z)\right]_i := \begin{cases} z_i & \text{if sign}([z_i]) = \text{sign}([x_k]_i) \\ 0 & \text{otherwise} \end{cases}$$

$\text{Proj}_{O_k}(\bullet)$ is an Euclidean projection, and ensures that the trial point $\tilde{y}_{t+1}$ is projected back to the current orthant face $O_k$ if it happens to be outside. In the example above, the next iteration $$y_{t+1} = \text{Proj}_{O_k}(\tilde{y}_{t+1})$$

turns out to be not only a better approximated solution but also sparser compared with $y_t$ since $[y_{t+1}]_2 = 0$ after the projection, which suggests the application of the orthant step in sparsity promotion.

In practice, by taking advantage of the fact that (11) is a reduced space problem, i.e., $[x_{k+1}]_{I^0}(x_k) \equiv 0$, we only need to store a small part of stochastic gradient information $$[g_t] \mathcal{I}^{\neq 0}(x_k),$$

and compute the projection of $$[\tilde{y}_{t+1}] \mathcal{I}^{\neq 0}(x_k).$$

This makes the procedure even more efficient since it is expected that $$|\mathcal{I}^{\neq 0 \blacktriangle}(x_k)| \ll n.$$

The orthant step originated from the orthant-based methods in deterministic optimization, which normally utilize second-order information. The selection of the orthant face $O_k$ is more effective by observing at the sign of the previous iteration (see (8)). Moreover, a stochastic version of the projected gradient method is developed in solving the subproblem (11), which only involves computation of first-order information on a mini-batch at each iteration. As a result, the orthant step makes rapid progress to optimality, while at the same time promoting sparse solutions.

We now discuss the role of $N_P$ and $N_O$ (line 4, 6, 8 to 10, Algorithm 1). As is implied by Algorithm 1, $N_P$ ($N_O$) controls how many consecutive epochs is desired for performing the Prox-SG Step (orthant step), and then switching to the other step. OBProx-SG is highly flexible to different choices of $N_P$ ($N_O$). For example, an alternating strategy between one Prox-SG Step and one Orthant Step corresponds to set $N_P = N_O = 1$, and a strategy of first performing several Prox-SG steps then followed by the Orthant Step corresponds to set $N_P < \infty$, $N_O = \infty$. A larger $N_P$ helps to predict a better orthant face $O_k$ which covers the support of $x^*$, and a larger $N_O$ helps to explore more sparsity within $O_k$.

As will be shown below, convergence of Algorithm 1 requires that either performing the Prox-SG Step infinitely many times ($N_P \leq \infty$, $N_O < \infty$), or performing a finite number of Prox-SG Steps followed by infinitely many Orthant Steps ($N_P < \infty$, $N_O = \infty$) given the support of $x^*$ has been covered by some $O_k$. In practice, without knowing $x^*$ ahead of time, we can always start by employing Prox-SG Step $N_P$ epochs, followed by running Orthant Step $N_O$ epochs, then repeating until convergence. However, it may be shown that performing the Prox-SG Step sufficiently many times and then continuously running the orthant step may produce even better solutions.

As discussed, it was assumed that f(x) is the average of N continuously differentiable functions, which may not be sufficient to derive a convergence theory for the OBProx-SG (Algorithm 1). Hence, we can make the following additional assumption. Particularly, we are interested in the case when f is convex.

Assumption 1. The function $$F: \mathbb{R}^n \to \mathbb{R}$$

is convex, continuously differentiable, and bounded below on the compact level set $$\mathcal{L} := \{x \in \mathbb{R}^n : F(x) \leq F(x_0)\},$$

where $x_0$ is the initialization of Algorithm 1. Moreover, the stochastic gradient $$\nabla f_{B_t}, \text{ and } \nabla \tilde{F}_{B_t}$$

evaluated on the mini-batch $B_t$ are Lipschitz continuous on the level set
$\mathcal{L}$
with a shared Lipschitz constant
$\mathcal{L}$
for all $B_t$.

Let $x^*$ be a global solution of problem (1), and $$\{x_k\}_{k=0}^{\infty}$$

be the iterations generated by Algorithm 1. It is desired to show that under Assumption 1, the objective values $\{F(x_k)\}$ and iterations $\{x_k\}$ converge to $F(x^*)$ and $x^*$ in expectation, respectively. Towards that end, we first define $$S_P \overset{def}{=} \{k \in \mathbb{Z}^{\geq 0}_+\} \mid : \text{Prox-SG Step is selected at } k\text{-th epoch}\} \quad (13)$$

$$S_O \overset{def}{=} \{k \in \mathbb{Z}^{\geq 0}\} \mid : \text{Orthant Step is selected at } k\text{-th epoch}\}$$

where $S_P(S_O)$ indicates which epoch conducts the Prox-SG Step (Orthant Step). Next, we show that $E[F(x_{k+1})]$ obtains sufficient decrease from $F(x_k)$ in both steps.

Lemma 2. Suppose $k \in S_P$, line 3 of Algorithm 2 yields that $y_{t+1} = y_t + \alpha_k s_{t,k}$, where $$s_{t,k} \in -(\nabla f_{B_t}(y_t) + \lambda \partial \|y_{t+1}\|_1). \quad (14)$$

And the objective value $F_{B_t}$ satisfies $$F_{B_t}(y_t + 1) \leq F_{B_t}(y_t) - \left(\alpha_k - \frac{\alpha_k^2 L}{2}\right) \|s_{t,k}\|_2^2. \quad (15)$$

Lemma 3. Suppose $k \in S_O$, line 5 of Algorithm 3 yields that $y_{t+1} = y_t + \alpha_k d_{t,k}$, where $$d_{t,k} \in -(g_t + \mathcal{N}_{O_k}(y_{t+1})), \text{ and} \quad (16)$$

$$\mathcal{N}_{O_k}(y_{t+1}) := \{v : v^T(y_{t+1} - x) \geq 0, \forall x \in O_k\} \quad (17)$$

is the normal conel of the orthant face $\mathcal{O}_k$ at $y_{t+1}$. Moreover, the objective value $F_{B_t}$ satisfies $$F_{\mathcal{B}_t}(y_t+1) \le F_{\mathcal{B}_t}(y_t) - \left(\alpha_k - \frac{\alpha_k^2 L}{2}\right)\|d_{t,k}\|_2^2. \quad (18)$$

According to Lemma 2 and Lemma 3, the objective value on a mini-batch tends to achieve a sufficient decrease in the Prox-SG Step and Orthant Step given $\alpha_k$ is small enough. By summing over t in (15) and (18), and taking the expectation on both sides, we obtain the following result characterizing the sufficient decrease from $F(x_k)$ to $\mathbb{E}[F(x_{k+1})]$.

Corollary 4. For epoch k, we have
(i) if $k \in S_P$, then $$\mathbb{E}[F(x_{k+1})] \le F(x_k) - \sum_{t=0}^{T-1}\left(\alpha_k - \frac{\alpha_k^2 L}{2}\right)\mathbb{E}[\|s_{t,k}\|_2^2]. \quad (19)$$

(ii) if $k \in S_O$, then $$\mathbb{E}[F(x_{k+1})] \le F(x_k) - \sum_{t=0}^{T-1}\left(\alpha_k - \frac{\alpha_k^2 L}{2}\right)\mathbb{E}[\|d_{t,k}\|_2^2]. \quad (20)$$

Corollary 4 indicates that in expectation both the Prox-SG Step and Orthant Step help to make progress towards optimality with appropriate choice of $\alpha_k$. In practice, we can choose the step size $\alpha_k$ in the following two ways:

(a) Let $\alpha_k$ be a constant such that $$\alpha_k = \alpha \in (0, 1/L], \forall k = 0, 1, 2 \ldots. \quad (21)$$

(b) Let $\alpha_k$ be varying per epoch, and satisfy $$\sum_{k=0}^{\infty} \alpha_k = \infty, \text{ and } \sum_{k=0}^{\infty} \alpha_k^2 < \infty. \quad (22)$$

We now state our first convergence result of OBProx-SG, which assumes $N_O < \infty$ such that the Prox-SG Step performs infinitely many times.

Theorem 5. Suppose problem (1) has a unique solution x*, and $\{\alpha_k\}$ is specified by (21) or (22). Let $N_O < \infty$, then Algorithm 1 satisfies:
(i) there exists an epoch k, such that $x_k = x^*$; or
(ii) $|S_P| = \infty$, and $$\lim_{k \to \infty} \mathbb{E}[F(x_k)] = F(x^*), \quad (23)$$

$$\lim_{k \to \infty} \mathbb{E}[x_k] = x^*.$$

Theorem 5 implies that if the Prox-SG Step is performed infinitely many times, then the objective values $\{F(x_k)\}$ and iterations $\{x_k\}$ converge in expectation, based on the progress to optimality shown in Corollary 4. However, in some cases it may not be desired to repeatedly switch back to the Prox-SG Step since it may affect the sparsity of the previous iteration from the orthant step due to its stochastic nature. Switching can be considered if the convergence is still guaranteed by performing a finite number of Prox-SG steps and then continuously performing orthant steps. Accordingly, the second convergence result of OBProx-SG may be as follows.

Theorem 6. Suppose problem (1) has a unique solution x*, and $\{\alpha_k\}$ is specified by (21) or (22) Let $N_P < \infty$, $N_O = \infty$. Given $x^* \in \mathcal{O}_{N_P}$. Algorithm satisfies:
(i) there exists an epoch k, such that $x_k = x^*$; or
(ii) $S_P = N_P < \infty$, $|S_O| = \infty$, and $$\lim_{k \to \infty} \mathbb{E}[F(x_k)] = F(x^*), \quad (24)$$

$$\lim_{k \to \infty} \mathbb{E}[x_k] = x^*.$$

Theorem 6 only requires performing a finite number of Prox-SG steps to ensure convergence given that the support of x* is already covered by the orthant face $O_k$ inhabited by the last iteration from the Prox-SG step. Although the assumption $x^* \in O_{N_P}$ is difficult to be verified in practice, setting $N_P$ to be large enough and $N_O = \infty$ may achieve desirable performance.

The following illustrates example pseudocode for a compression model utilizing OBProx-SG, where the OBProx-SG is used for the minimization step. The expectation step below constructs a smaller model based on the sparse solution from OBProx SG.

---

Algorithm 1 General Expectation Minimization Framework

1: Input: Initial parameter $x^0$, initial huge model $\mathcal{M}^0$.
2: while Stopping criteria of Algorithm 3 is not satisfied, in tth iteration do
3:    Expectation: Update model $\mathcal{M}^{t+1}$ based on previous parameter $x^t$ by Algorithm 2.
4:    Minimization: Optimize parameter $x_{t+1}$ via solving/approximate $$(\text{Min-Step})\ x^{t+1} := \arg\min_x F(x|\mathcal{M}^{t+1}) = f(x) + \lambda^{t+1} \cdot \Omega(x; \mathcal{M}^{t+1}).$$

where $\lambda^{t+1}$ is computed as $$\lambda^{t+1} = \frac{|\mathcal{M}^{t+1}|}{|\mathcal{M}^t|}\lambda^t. \quad (1)$$

5: Output: Final parameter $x^T$, and model $\mathcal{M}^T$.

---

Algorithm 2 Expectation Step

1: Input: Parameter $x^t$, CNN model $\mathcal{M}^t$.
2: Suppose the CNN model $\mathcal{M}^t$ contains $L^t$ convolution layers,
   in $\ell$th convolution layer (with $\ell \in \{1, \ldots, L^t\}$), there are $K_\ell^t$ kernels, say $k_k^{\ell,t}$ with $k \in \{1, \ldots, K_\ell^t\}$,
   for kernel $k_k^{\ell,t}$, let $s_k^{\ell,t} \in [0, 1]$ be its sparsity level.
3: For $\ell$th layer, compute the empirical average sparsity level $$s^{-\ell,t} = \frac{1}{K_\ell^t}\sum_{h=1}^{K_\ell^t} s_k^{\ell,t}.$$

-continued

Algorithm 2 Expectation Step

4: The updated CNN model $\mathcal{M}^{t+1}$
contains $L^{t+1} \leftarrow L^t$ convolution layers,
in $\ell$th convolution layer (with $\ell \in \{1, \ldots, L^{t+1} - 1\}$), there are $$K_\ell^{t+1} = \begin{cases} 0 & \text{if } \lceil K_\ell^t \cdot \overline{s}^{t+1} \rceil \leq 1 \\ \lceil K_\ell^t \cdot \max\{\overline{s}^{t+1}, \epsilon\} \rceil & \text{otherwise} \end{cases} \quad (2)$$

kernels, where $\epsilon$ is the prescribed threshold.
in $L^{t+1}$th convolution layer, there are $K_L$ kernels.
remove layers with 0 kernels.
5: Output: The CNN model $\mathcal{M}^{t+1}$.

Algorithm 3 Termination Condition

1: Input: tth iteration, sparsity level of $x^t$.
2: if $t > T$ or sparsity level of $x^t \leq \delta$ then
3:    Stop Referring to the appended drawings, in which like numerals represent like elements throughout the several FIGURES, aspects of various technologies for detecting unauthorized certificates will be described. In the following detailed description, references are made to the accompanying drawings that form a part hereof, and which are shown by way of illustration specific configurations or examples.

Figure 3:
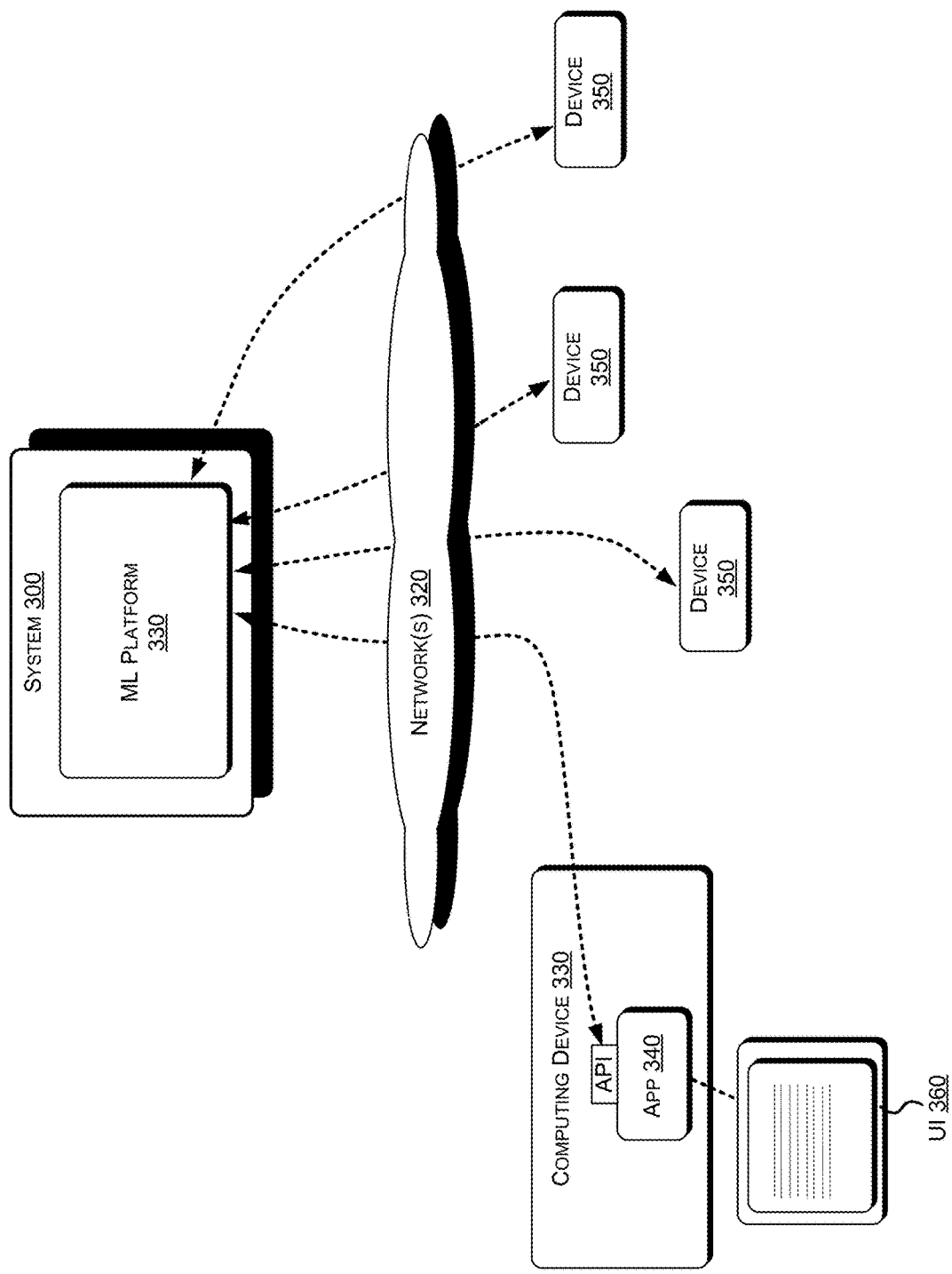
FIG. 3 is a diagram showing aspects of an example system according to one embodiment disclosed herein.

In the example system illustrated in FIG. 3, a system 300 is illustrated that implements machine learning (ML) platform 330. The ML platform 330 may be configured to provide output data to various devices 350 over a network 320, as well as computing device 330. A user interface 360 may be rendered on computing device 330. The user interface 360 may be provided in conjunction with an application 340 that communicates to the ML platform 330 using an API via network 320. In some embodiments, system 300 may be configured to provide product information to users. In one example, ML platform 330 may implement a machine learning system to perform one or more tasks. The ML platform 330 utilize the machine learning system to perform tasks such as image and writing recognition. The machine learning system may be configured to be optimized using the techniques described herein.

Figure 4:
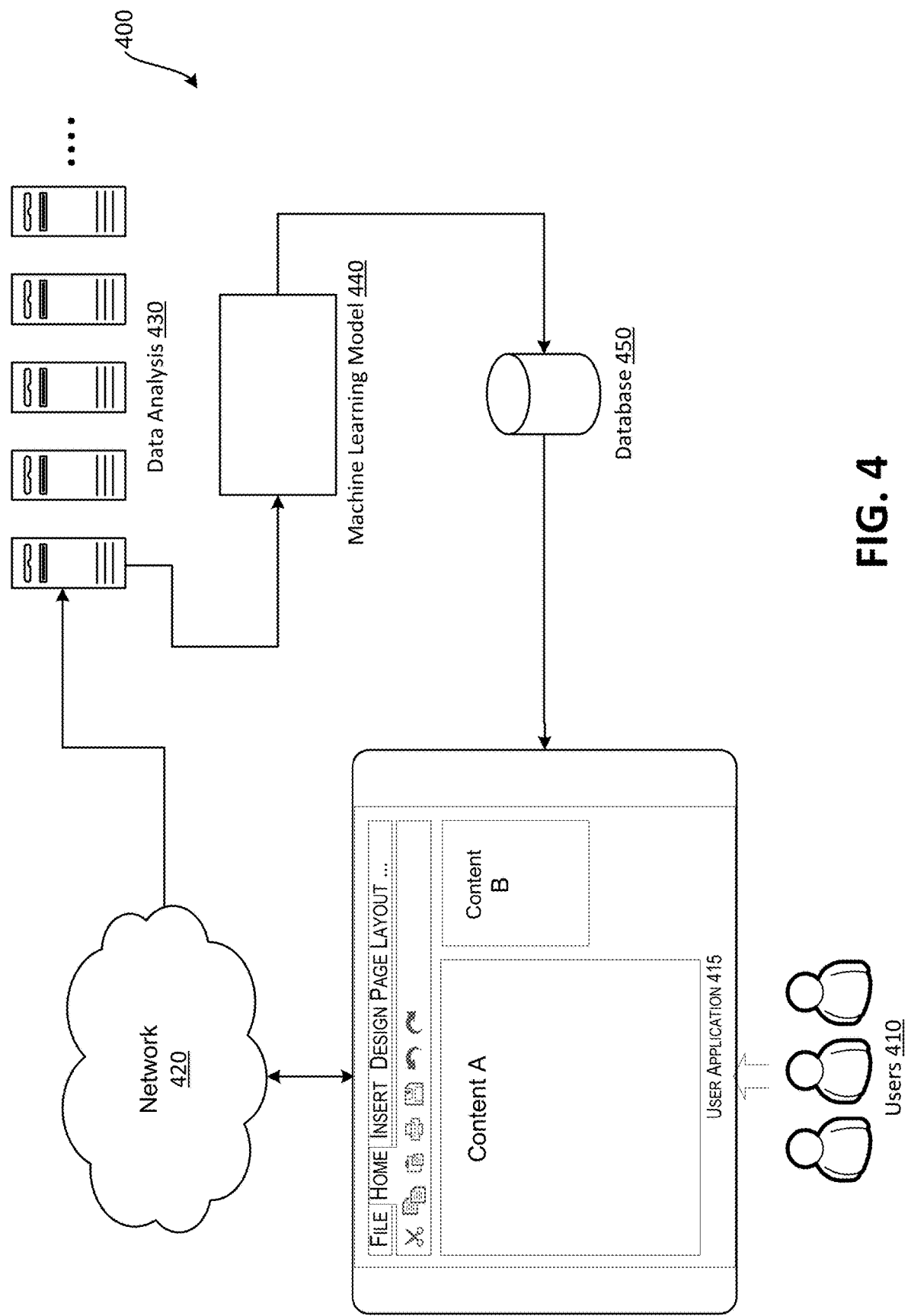
FIG. 4 is a diagram showing aspects of an example system according to one embodiment disclosed herein.

FIG. 4 is a computing system architecture diagram showing an overview of a system disclosed herein for implementing a machine learning model, according to one embodiment disclosed herein. As shown in FIG. 4, a machine learning system 400 may be configured to perform analysis and perform identification, prediction, or other functions based upon various data collected by and processed by data analysis components 430 (which might be referred to individually as an "data analysis component 430" or collectively as the "data analysis components 430"). The data analysis components 430 may, for example, include, but are not limited to, physical computing devices such as server computers or other types of hosts, associated hardware components (e.g. memory and mass storage devices), and networking components (e.g. routers, switches, and cables). The data analysis components 430 can also include software, such as operating systems, applications, and containers, network services, virtual components, such as virtual disks, virtual networks, and virtual machines. The database 450 can include data, such as a database, or a database shard (i.e. a partition of a database). Feedback may be used to further update various parameters that are used by machine learning model 420. Data may be provided to the user application 400 to provide results to various users 410 using a user application 415. In some configurations, machine learning model 420 may be configured to utilize supervised and/or unsupervised machine learning technologies. A model compression framework based on sparsity-inducing regularization optimization as disclosed herein can reduce the amount of data that needs to be processed in such systems and applications. Effective model compression when processing iterations over large amounts of data may provide improved latencies for a number of applications that use such technologies, such as image and sound recognition, recommendation systems, and image analysis.

Figure 5:
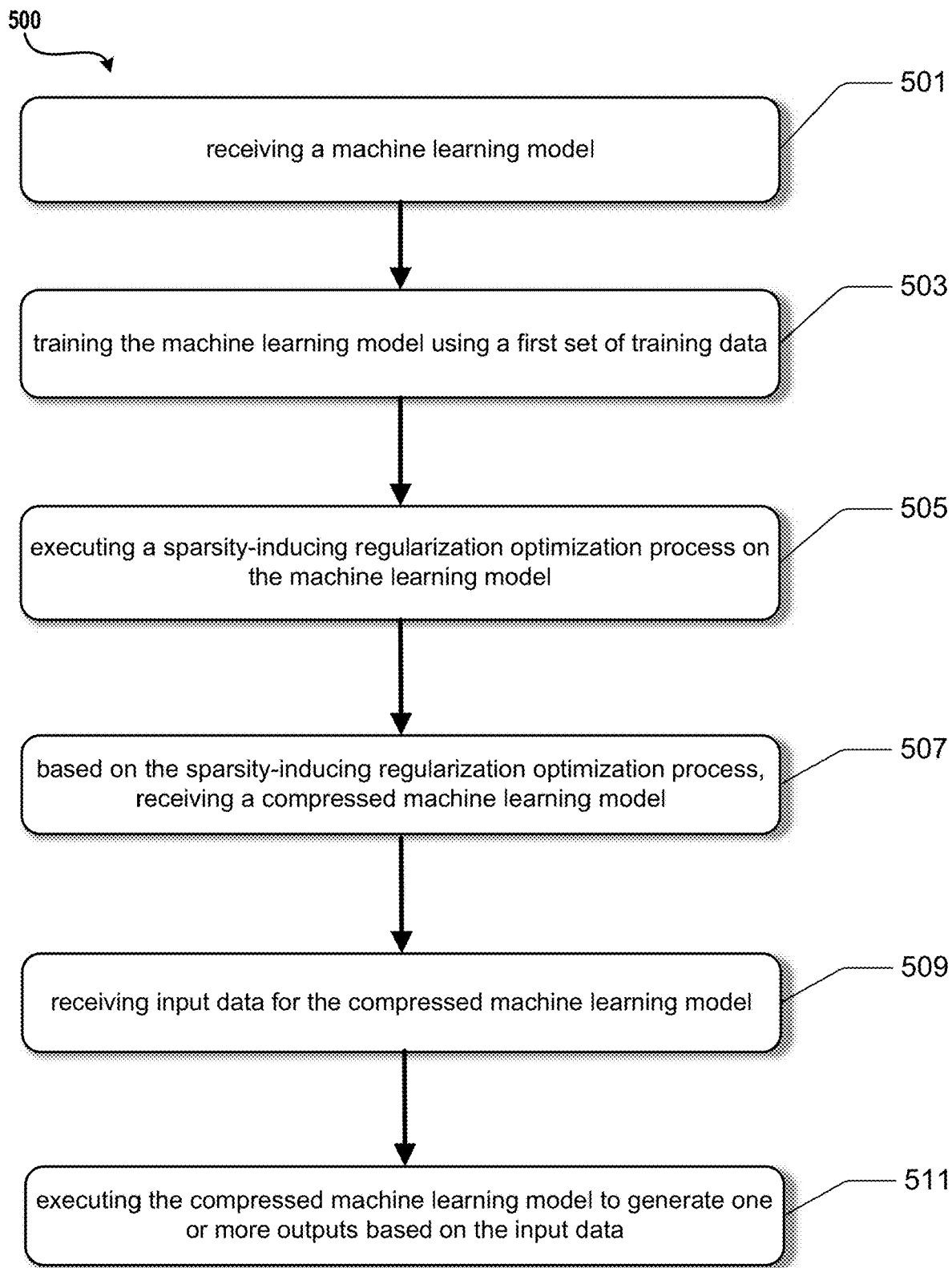
FIG. 5 is a flow diagram showing aspects of an illustrative routine, according to one embodiment disclosed herein.

Turning now to FIG. 5, illustrated is an example operational procedure for performing model compression in accordance with the present disclosure. The operational procedure may be implemented in a system comprising one or more computing devices.

It should be understood by those of ordinary skill in the art that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, performed together, and/or performed simultaneously, without departing from the scope of the appended claims.

It should also be understood that the illustrated methods can end at any time and need not be performed in their entireties. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like. Although the example routine described below is operating on a computing device, it can be appreciated that this routine can be performed on any computing system which may include a number of computers working in concert to perform the operations disclosed herein.

Thus, it should be appreciated that the logical operations described herein are implemented (1) as a sequence of computer implemented acts or program modules running on a computing system such as those described herein and/or (2) as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof.

Referring to FIG. 5, operation 501 illustrates receiving a machine learning model implemented in a computing system.

Operation 501 may be followed by operation 503. Operation 503 illustrates training the machine learning model using a first set of training data.

Operation 503 may be followed by operation 505. Operation 505 illustrates executing a sparsity-inducing regularization optimization process on the machine learning model.

Operation 505 may be followed by operation 507. Operation 507 illustrates based on the sparsity-inducing regularization optimization process, receiving a compressed machine learning model.

Operation 507 may be followed by operation 509. Operation 509 illustrates receiving input data for the compressed machine learning model.

Operation 509 may be followed by operation 511. Operation 511 illustrates executing the compressed machine learning model to generate one or more outputs based on the input data.

In an embodiment, the sparsity-inducing regularization optimization process comprises a stochastic method for solving the $\ell$1-regularization problem $$\underset{x \in \mathbb{R}^n}{\text{minimize}} \left\{ F(x) \overset{def}{=} f(x) + \lambda \|x\|_1 \right\}.$$

In an embodiment, the stochastic method comprises an orthant-based proximal stochastic gradient method.

In an embodiment, the orthant-based proximal stochastic gradient method comprises using the stochastic gradient on a mini-batch to approximate a full gradient.

In an embodiment, the orthant-based proximal stochastic gradient method comprises utilizing the sign of the previous iteration to select an orthant face during the orthant step.

In an embodiment, only first-order derivative information is used to progress in a selected orthant face.

In an embodiment, the method further comprises an orthant step and a proximal gradient method.

In an embodiment, the method further comprises using switching parameters to control a period for the orthant step and proximal gradient method.

In an embodiment, the machine learning model is configured to implement one or more of image recognition, sound recognition, recommendation generation, or data analysis.

In an embodiment, the machine learning model is a deep neural network.

Figure 6:
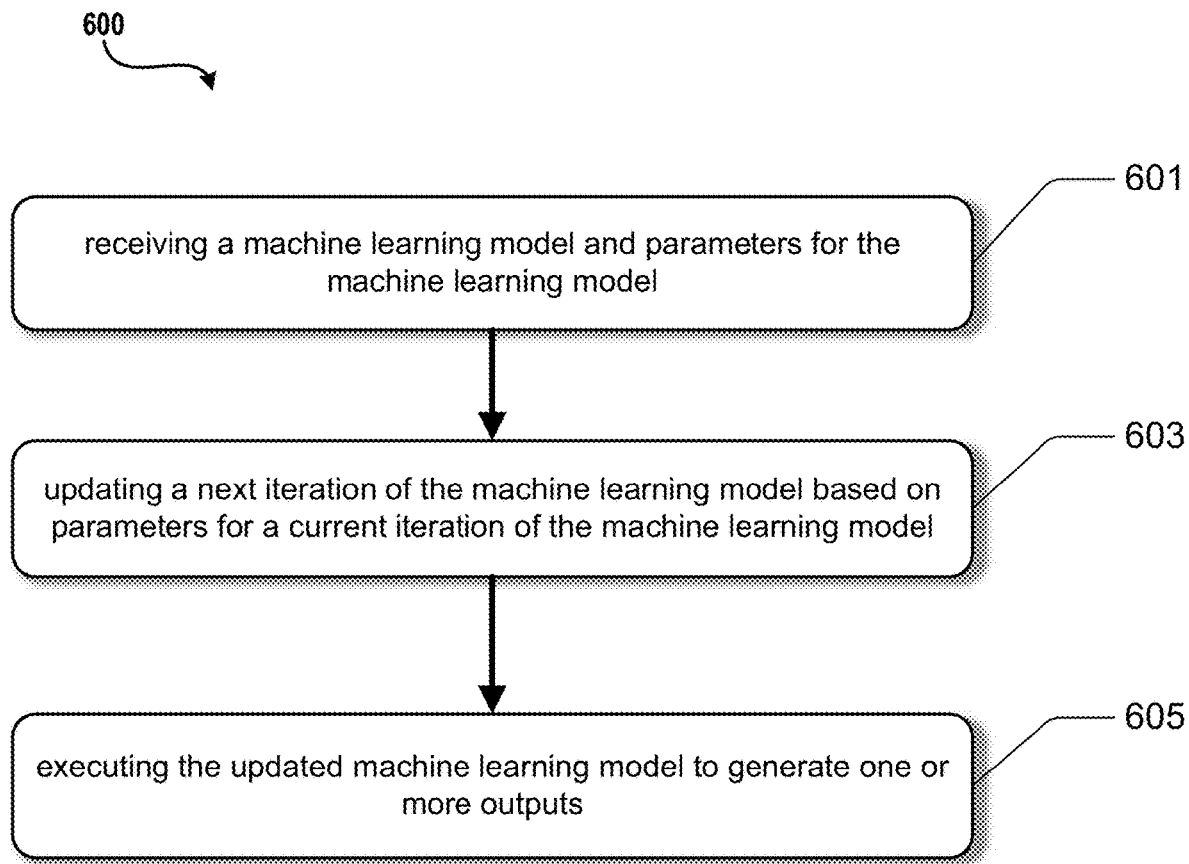
FIG. 6 is a flow diagram showing aspects of an illustrative routine, according to one embodiment disclosed herein.

Referring to FIG. 6, operation 601 illustrates receiving a machine learning model and parameters for the machine learning model.

Operation 601 may be followed by operation 603. Operation 603 illustrates updating a next iteration of the machine learning model based on parameters for a current iteration of the machine learning model. In an embodiment, the machine learning model is updated using a sparsity-inducing regularization optimization process.

Operation 603 may be followed by operation 605. Operation 605 illustrates executing the updated machine learning model to generate one or more outputs.

Figure 7:
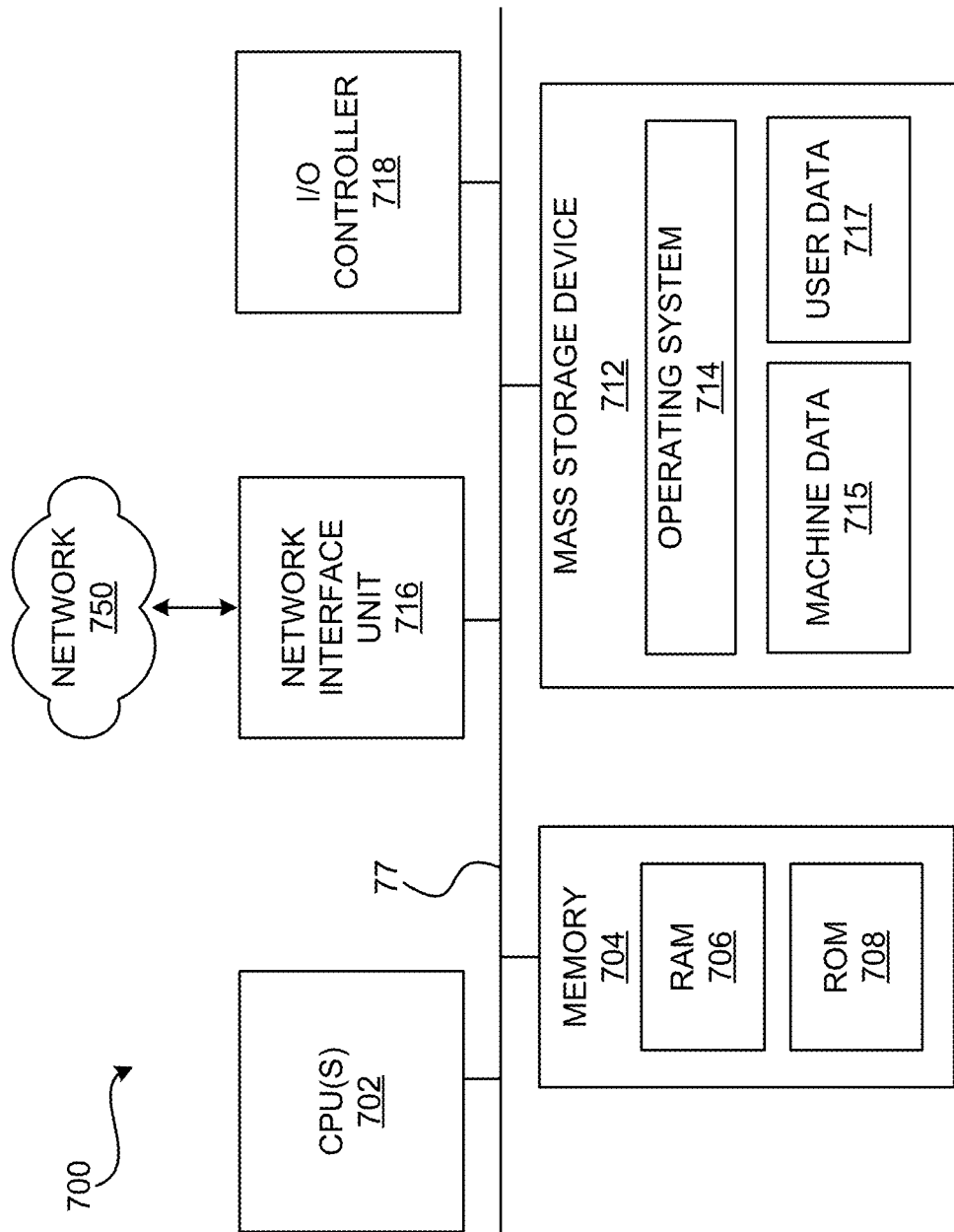
FIG. 7 is a computer architecture diagram illustrating aspects of an example computer architecture for a computer capable of executing the software components described herein.

FIG. 7 shows an example computer architecture for a computer capable of providing the functionality described herein such as, for example, a computing device configured to implement the functionality described above with reference to FIGS. 1-6. Thus, the computer architecture 700 illustrated in FIG. 7 illustrates an architecture for a server computer or another type of computing device suitable for implementing the functionality described herein. The computer architecture 700 might be utilized to execute the various software components presented herein to implement the disclosed technologies.

The computer architecture 700 illustrated in FIG. 7 includes a central processing unit 702 ("CPU"), a system memory 704, including a random-access memory 706 ("RAM") and a read-only memory ("ROM") 708, and a system bus 77 that couples the memory 704 to the CPU 702. A firmware containing basic routines that help to transfer information between elements within the computer architecture 700, such as during startup, is stored in the ROM 708. The computer architecture 700 further includes a mass storage device 712 for storing an operating system 714, other data, such as product data 715 or user data 717.

The mass storage device 712 is connected to the CPU 702 through a mass storage controller (not shown) connected to the bus 77. The mass storage device 712 and its associated computer-readable media provide non-volatile storage for the computer architecture 700. Although the description of computer-readable media contained herein refers to a mass storage device, such as a solid-state drive, a hard disk or optical drive, it should be appreciated by those skilled in the art that computer-readable media can be any available computer storage media or communication media that can be accessed by the computer architecture 700.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, radio frequency, infrared and other wireless media. Combinations of the any of the above should also be included within the scope of computer-readable media.

Byway of example, and not limitation, computer-readable storage media might include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 700. For purposes of the claims, the phrase "computer storage medium," "computer-readable storage medium" and variations thereof, does not include waves, signals, and/or other transitory and/or intangible communication media, per se.

According to various implementations, the computer architecture 700 might operate in a networked environment using logical connections to remote computers through a network 750 and/or another network (not shown). A computing device implementing the computer architecture 700 might connect to the network 750 through a network interface unit 716 connected to the bus 77. It should be appreciated that the network interface unit 716 might also be utilized to connect to other types of networks and remote computer systems.

The computer architecture 700 might also include an input/output controller 718 for receiving and processing input from a number of other devices, including a keyboard, mouse, or electronic stylus (not shown in FIG. 7). Similarly, the input/output controller 718 might provide output to a display screen, a printer, or other type of output device (also not shown in FIG. 7).

It should be appreciated that the software components described herein might, when loaded into the CPU 702 and executed, transform the CPU 702 and the overall computer architecture 700 from a general-purpose computing system into a special-purpose computing system customized to facilitate the functionality presented herein. The CPU 702 might be constructed from any number of transistors or other discrete circuit elements, which might individually or collectively assume any number of states. More specifically, the CPU 702 might operate as a finite-state machine, in response to executable instructions contained within the software modules disclosed herein. These computer-executable instructions might transform the CPU 702 by specifying how the CPU 702 transitions between states, thereby transforming the transistors or other discrete hardware elements constituting the CPU 702.

Encoding the software modules presented herein might also transform the physical structure of the computer-readable media presented herein. The specific transformation of physical structure might depend on various factors, in different implementations of this description. Examples of such factors might include, but are not limited to, the technology used to implement the computer-readable media, whether the computer-readable media is characterized as primary or secondary storage, and the like. If the computer-readable media is implemented as semiconductor-based memory, the software disclosed herein might be encoded on the computer-readable media by transforming the physical state of the semiconductor memory. For example, the software might transform the state of transistors, capacitors, or other discrete circuit elements constituting the semiconductor memory. The software might also transform the physical state of such components in order to store data thereupon.

As another example, the computer-readable media disclosed herein might be implemented using magnetic or optical technology. In such implementations, the software presented herein might transform the physical state of magnetic or optical media, when the software is encoded therein. These transformations might include altering the magnetic characteristics of locations within given magnetic media. These transformations might also include altering the physical features or characteristics of locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 700 in order to store and execute the software components presented herein. It also should be appreciated that the computer architecture 700 might include other types of computing devices, including hand-held computers, embedded computer systems, personal digital assistants, and other types of computing devices known to those skilled in the art.

It is also contemplated that the computer architecture 700 might not include all of the components shown in FIG. 7, might include other components that are not explicitly shown in FIG. 7, or might utilize an architecture completely different than that shown in FIG. 7. For example, and without limitation, the technologies disclosed herein can be utilized with multiple CPUS for improved performance through parallelization, graphics processing units ("GPUs") for faster computation, and/or tensor processing units ("TPUs"). The term "processor" as used herein encompasses CPUs, GPUs, TPUs, and other types of processors.

Figure 8:
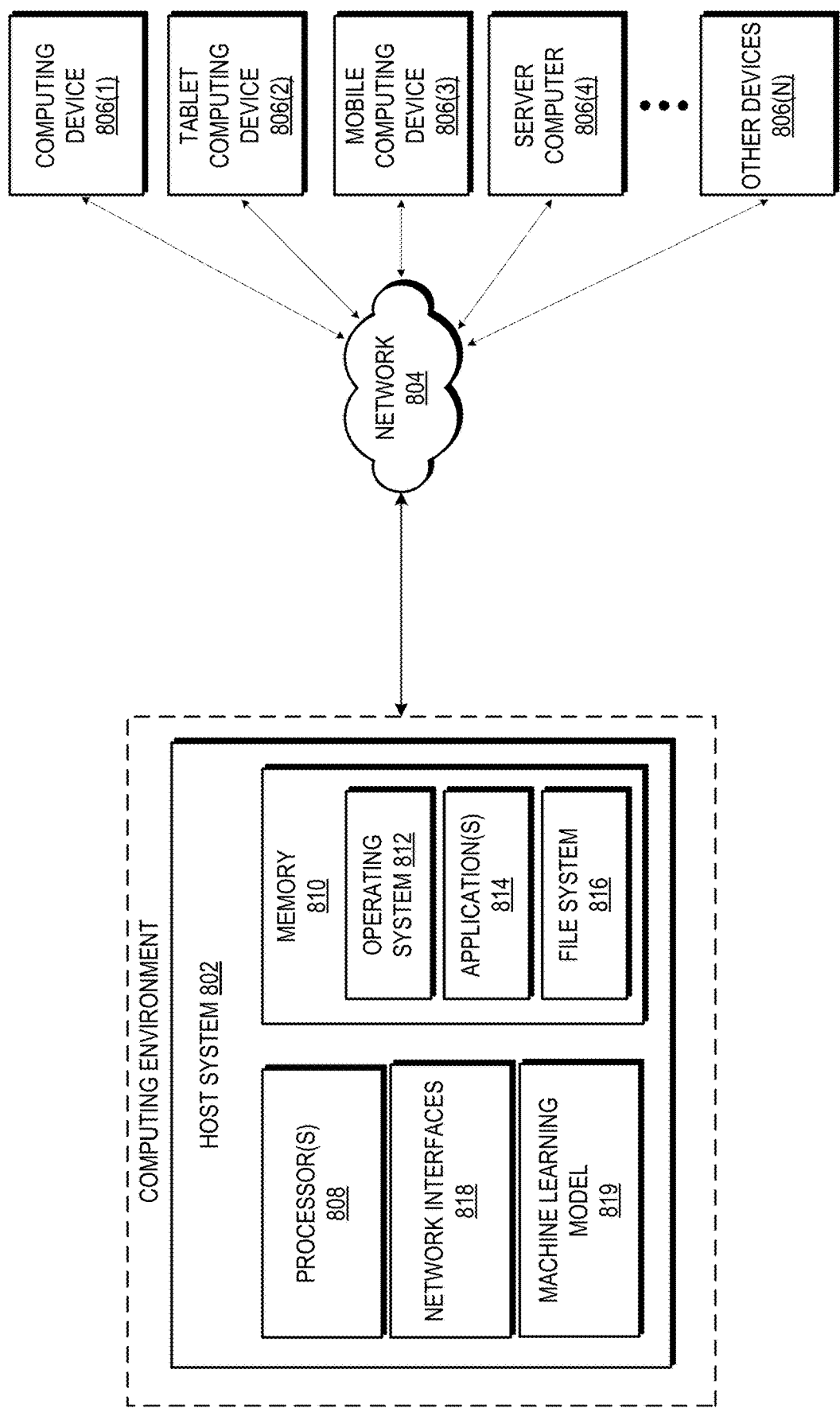
FIG. 8 is a data architecture diagram showing an illustrative example of a computer environment.

FIG. 8 illustrates an example computing environment capable of executing the techniques and processes described above with respect to FIGS. 1-7. In various examples, the computing environment comprises a host system 802. In various examples, the host system 802 operates on, in communication with, or as part of a network 804.

The network 804 can be or can include various access networks. For example, one or more client devices 806(1) . . . 806(N) can communicate with the host system 802 via the network 804 and/or other connections. The host system 802 and/or client devices can include, but are not limited to, any one of a variety of devices, including portable devices or stationary devices such as a server computer, a smart phone, a mobile phone, a personal digital assistant (PDA), an electronic book device, a laptop computer, a desktop computer, a tablet computer, a portable computer, a gaming console, a personal media player device, or any other electronic device.

According to various implementations, the functionality of the host system 802 can be provided by one or more servers that are executing as part of, or in communication with, the network 804. A server can host various services, virtual machines, portals, and/or other resources. For example, a can host or provide access to one or more portals, Web sites, and/or other information.

The host system 802 can include processor(s) 808 memory 810. The memory 810 can comprise an operating system 812, application(s) 814, and/or a file system 816. Moreover, the memory 810 can comprise the storage unit(s) 82 described above with respect to FIGS. 1-5.

The processor(s) 808 can be a single processing unit or a number of units, each of which could include multiple different processing units. The processor(s) can include a microprocessor, a microcomputer, a microcontroller, a digital signal processor, a central processing unit (CPU), a graphics processing unit (GPU), a security processor etc. Alternatively, or in addition, some or all of the techniques described herein can be performed, at least in part, by one or more hardware logic components. For example, and without limitation, illustrative types of hardware logic components that can be used include a Field-Programmable Gate Array (FPGA), an Application-Specific Integrated Circuit (ASIC), an Application-Specific Standard Products (ASSP), a state machine, a Complex Programmable Logic Device (CPLD), other logic circuitry, a system on chip (SoC), and/or any other devices that perform operations based on instructions. Among other capabilities, the processor(s) may be configured to fetch and execute computer-readable instructions stored in the memory 810.

The memory 810 can include one or a combination of computer-readable media. As used herein, "computer-readable media" includes computer storage media and communication media.

Computer storage media includes volatile and non-volatile, removable and non-removable media implemented in any method or technology for storage of information, such as computer-readable instructions, data structures, program modules, or other data. Computer storage media includes, but is not limited to, phase change memory (PCM), static random-access memory (SRAM), dynamic random-access memory (DRAM), other types of random-access memory (RAM), read-only memory (ROM), electrically erasable programmable ROM (EEPROM), flash memory or other memory technology, compact disk ROM (CD-ROM), digital versatile disks (DVD) or other optical storage, magnetic cassettes, magnetic tape, magnetic disk storage or other magnetic storage devices, or any other medium that can be used to store information for access by a computing device.

In contrast, communication media includes computer-readable instructions, data structures, program modules, or other data in a modulated data signal, such as a carrier wave. As defined herein, computer storage media does not include communication media.

The host system 802 can communicate over the network 804 via network interfaces 818. The network interfaces 818 can include various types of network hardware and software for supporting communications between two or more devices.

The host system 802 may also include machine learning model 819.

CONCLUSION

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A computing system, comprising:
   one or more processors; and
   a computer-readable storage medium having computer-executable instructions stored thereupon which, when executed by the processor, cause the computing system to perform operations comprising:
   receiving a machine learning model and parameters for the machine learning model;
   updating a next iteration of the machine learning model based on parameters for a current iteration of the machine learning model, wherein the machine learning model is updated using a sparsity-inducing regularization optimization process, wherein the sparsity-inducing regularization optimization process comprises an orthant-based proximal stochastic gradient method; and
   executing the updated machine learning model to generate one or more outputs.

2. The computing system of claim 1, wherein the orthant-based proximal stochastic gradient method comprises using the stochastic gradient on a mini-batch to approximate a full gradient.

3. The computing system of claim 1, wherein the orthant-based proximal stochastic gradient method comprises utilizing the sign of the previous iteration to select an orthant face during an orthant step.

4. The computing system of claim 1, wherein the sparsity-inducing regularization optimization process comprises an orthant step and a proximal gradient method.

5. The computing system of claim 4, further comprising using switching parameters to control a period for the orthant step and proximal gradient method.

6. The computing system of claim 1, wherein the machine learning model is a deep neural network.

7. A computer-implemented method comprising:
   receiving a machine learning model and parameters for the machine learning model;
   updating a next iteration of the machine learning model based on parameters for a current iteration of the machine learning model, wherein the machine learning model is updated using a sparsity-inducing regularization optimization process, wherein the sparsity inducing regularization optimization process includes solving an $\ell_1$-regularization problem; and
   executing the updated machine learning model to generate one or more outputs.

8. The computer-implemented method of claim 7, wherein the sparsity-inducing regularization optimization process comprises an orthant-based proximal stochastic gradient method.

9. The computer-implemented method of claim 8, wherein the orthant-based proximal stochastic gradient method comprises using the stochastic gradient on a mini-batch to approximate a full gradient.

10. The computer-implemented method of claim 8, wherein the orthant-based proximal stochastic gradient method comprises utilizing the sign of the previous iteration to select an orthant face during an orthant step.

11. The computer-implemented method of claim 7, wherein the sparsity-inducing regularization optimization process comprises an orthant step and a proximal gradient method.

12. The computer-implemented method of claim 11, further comprising using switching parameters to control a period for the orthant step and proximal gradient method.

13. The computer-implemented method of claim 7, wherein the machine learning model is a deep neural network.

14. A computing system, comprising:
    one or more processors; and
    a computer-readable storage medium having computer-executable instructions stored thereupon which, when executed by the processor, cause the computing system to perform operations comprising:
    receiving a neural network and parameters for the neural network;
    updating a next iteration of the neural network based on parameters for a current iteration of the neural network, wherein the neural network is updated using a sparsity-inducing regularization optimization process, wherein execution of the sparsity-inducing regularization optimization process comprises using switching parameters to control a period for the orthant step and proximal gradient method; and
    executing the updated neural network to generate one or more outputs.

15. The computing system of claim 14, wherein the neural network is configured to implement one or more of image recognition, sound recognition, recommendation generation, or data analysis.

16. The computing system of claim 14, wherein the sparsity-inducing regularization optimization process comprises a stochastic method for solving the $\ell 1$-regularization problem $$\underset{x \in \mathbb{R}^n}{\text{minimize}} \left\{ F(x) \overset{def}{=} f(x) + \lambda \|x\|_1 \right\}.$$

17. The computing system of claim 16, wherein the stochastic method comprises an orthant-based proximal stochastic gradient method.

18. The computing system of claim 17, wherein the orthant-based proximal stochastic gradient method comprises using the stochastic gradient on a mini-batch to approximate a full gradient.

19. The computing system of claim 14, wherein the orthant-based proximal stochastic gradient method comprises utilizing the sign of the previous iteration to select an orthant face during an orthant step.

\* \* \* \* \*